US010701304B2

(12) United States Patent
Devendran et al.

(10) Patent No.: US 10,701,304 B2
(45) Date of Patent: Jun. 30, 2020

(54) POWER MANAGEMENT IN AN ARTIFICIAL WINDOW SYSTEM

(71) Applicant: DPA VENTURES, INC., Needham, MA (US)

(72) Inventors: Pooja Devendran, Needham, MA (US); Partha Dutta, Clifton Park, NY (US); Saurabh Ullal, Hollis, NH (US); Anand Devendran, Needham, MA (US); Kedar Gupta, Hollis, NH (US); Mark Pettus, Dalton, MA (US)

(73) Assignee: DPA VENTURES, INC., Needham, MA (US)

( * ) Notice: Subject to any disclaimer, the term of this patent is extended or adjusted under 35 U.S.C. 154(b) by 28 days.

(21) Appl. No.: 16/008,504

(22) Filed: Jun. 14, 2018

(65) Prior Publication Data

US 2018/0367751 A1 Dec. 20, 2018

Related U.S. Application Data

(60) Provisional application No. 62/519,583, filed on Jun. 14, 2017.

(51) Int. Cl.
*H04N 5/63* (2006.01)
*H04N 5/272* (2006.01)
(Continued)

(52) U.S. Cl.
CPC .......... *H04N 5/63* (2013.01); *F21V 23/0464* (2013.01); *G06K 9/4661* (2013.01); *H04N 5/225* (2013.01);
(Continued)

(58) Field of Classification Search
CPC ............ H04N 5/225; H04N 5/57; H04N 5/63; H04N 5/64; G06K 9/4661; F21V 11/65; F21V 23/0464
See application file for complete search history.

(56) References Cited

U.S. PATENT DOCUMENTS 8,259,178 B2 * 9/2012 Basso ....................... G09F 9/35
348/169
9,342,467 B1 * 5/2016 McGrath ................ G09G 3/003
(Continued)

OTHER PUBLICATIONS

International Search Report and Written Opinion dated Sep. 10, 2018 in corresponding PCT Patent Application No. PCT/US2018/037427.

*Primary Examiner* — Ngoc Yen T Vu
(74) *Attorney, Agent, or Firm* — Grossman, Tucker, Perreault & Pfleger, PLLC

(57) ABSTRACT

In general, the present disclosure is directed to an artificial window system that can simulate the user experience of a traditional window in environments where exterior walls are unavailable or other constraints make traditional windows impractical. In an embodiment, an artificial window consistent with the present disclosure includes a window panel, a panel driver, and a camera device. The camera device captures a plurality of image frames representative of an outdoor environment and provides the same to the panel driver. A controller of the panel driver sends the image frames as a video signal to cause the window panel to visually output the same. The window panel may further include light panels, and the controller may extract light characteristics from the captured plurality of image frames to send signals to the light panels to cause the light panels to mimic outdoor lighting conditions.

20 Claims, 11 Drawing Sheets

(51) Int. Cl.
  *F21V 23/04* (2006.01)
  *H04N 5/57* (2006.01)
  *G06K 9/46* (2006.01)
  *H04N 5/225* (2006.01)
  *H04N 5/60* (2006.01)
  *F24F 11/65* (2018.01)
  *H04N 5/64* (2006.01)
  *H04N 5/262* (2006.01)

(52) U.S. Cl.
  CPC .............. *H04N 5/57* (2013.01); *F24F 11/65* (2018.01); *H04N 5/2624* (2013.01); *H04N 5/272* (2013.01); *H04N 5/60* (2013.01); *H04N 5/64* (2013.01)

(56) References Cited

U.S. PATENT DOCUMENTS

| | | |
|---|---|---|
| 10,063,848 B2 * | 8/2018 | Posa ................ H04N 21/42202 |
| 2005/0280706 A1 | 12/2005 | Jong |
| 2009/0273302 A1 | 11/2009 | Staats et al. |
| 2012/0288139 A1 | 11/2012 | Singhar |
| 2013/0007638 A1 | 1/2013 | Basso et al. |
| 2013/0165741 A1 | 6/2013 | Seabury et al. |
| 2014/0133008 A1 | 5/2014 | Mitchell et al. |
| 2015/0170604 A1 | 6/2015 | Iwagaki et al. |
| 2017/0094167 A1 | 3/2017 | Riedel |
| 2017/0098332 A1 * | 4/2017 | Knight ...................... G06T 7/10 |
| 2019/0311467 A1 * | 10/2019 | Neulander ........... H04N 5/2351 |

* cited by examiner

POWER MANAGEMENT IN AN ARTIFICIAL WINDOW SYSTEM

CROSS-REFERENCE TO RELATED APPLICATIONS

The present non-provisional application claims the benefit of U.S. Provisional Patent Application Ser. No. 62/519,583 filed on Jun. 14, 2017, the entire content of which is hereby incorporated by reference.

TECHNICAL FIELD

The present disclosure relates to artificial windows systems, and in particular, to an artificial window system that provides an immersive experience to approximate the look and feel of a conventional window, and a power management scheme to significantly reduce power consumption without necessarily reducing image quality displayed by the artificial window.

BACKGROUND

Artificial windows are useful and desirable in interior environments, such as buildings or vehicles, where traditional windows are unavailable or impractical. Studies have shown that light from windows impacts both mental and physical health, and in some cases doctors may prescribe light therapies to address certain conditions including sleep disorders and general mood disorders, e.g., bipolar disorder. In general, an artificial window may be mounted on an interior wall to provide a fixed or video view of an outside environment. An artificial window may also include one or more light sources that replicate outdoor lighting conditions. On example of an artificial window system is described in U.S. Patent Application Publication No. 2013/0165741, the teachings of which are hereby incorporated herein by reference. However, the "feel" of a traditional window is difficult to approximate and the human brain can subconsciously detect the subtle differences when viewing an artificial window. In addition, artificial windows can include large display screens that output high definition images which can result in large amounts of power consumed during operation.

BRIEF DESCRIPTION OF THE DRAWINGS

Reference should be made to the following detailed description which should be read in conjunction with the following figures, wherein like numerals represent like parts.

DETAILED DESCRIPTION

Figure 1:
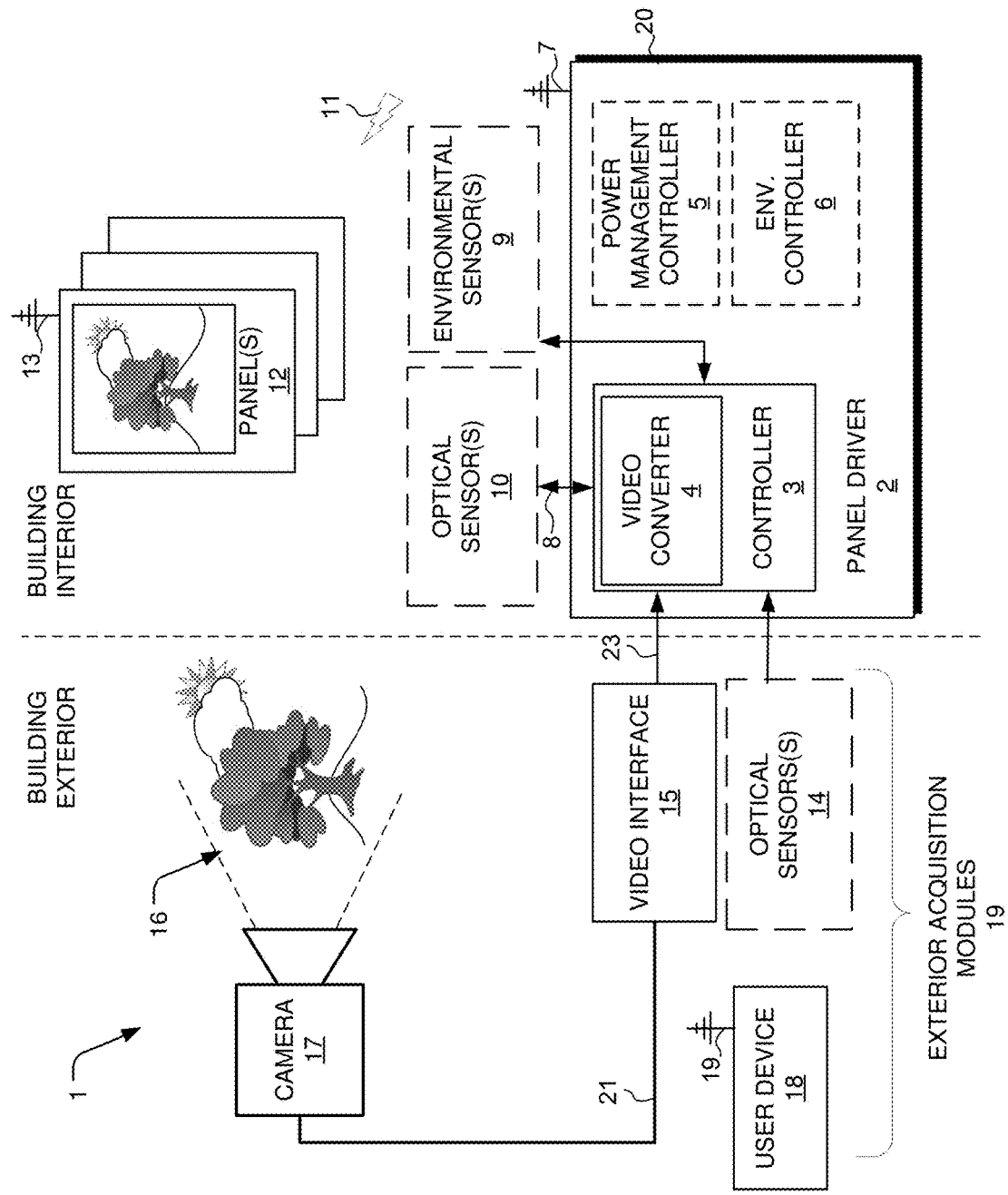
FIG. 1 shows an embodiment of an artificial window system consistent with the present disclosure.

In general, the present disclosure is directed to an artificial window system that can simulate the user experience of a traditional window in environments where exterior walls are unavailable or other constraints make traditional windows impractical. In an embodiment, an artificial window consistent with the present disclosure includes a window panel, a panel driver, and a camera device. The camera device captures a plurality of image frames representative of an outdoor environment and provides the same to the panel driver. A controller of the panel driver sends the image frames as a video signal to cause the window panel to visually output the same. The window panel may further include light panels, and the controller may extract light characteristics from the captured plurality of image frames to send signals to the light panels to cause the light panels to mimic outdoor lighting conditions.

In one specific example embodiment, an artificial window system consistent with the present disclosure includes a window covering that may be a separate physical device, e.g., a shade device, or may be virtually represented on a display screen. A user may 'draw' the window covering to obscure a portion of the artificial window. In response, the position of the window covering may be detected by a power management controller of the artificial window system and used to transition a region of the display screen that is obscured by the window covering into a low-power mode. The window covering may be a standard window covering such as a blind or shade, and the power management controller may determine the position of the window covering based on one or more sensors such as an encoding device, proximity sensor, or potentiometer. The power management controller may also use an occupancy sensor to determine when the artificial window may be transitioned to a low-power mode. Thus, relatively inexpensive window coverings may be utilized to enhance the 'realism' of the artificial window while providing significant power savings by limiting power when portions of a display screen get obscured or are otherwise covered by the window covering.

Artificial windows consistent with the present disclosure may be utilized in a wide-range of environments and applications including, for example, residential, professional (e.g., office spaces), warehouses, hotels, recording studios, airports, air planes, ships (e.g., cruise ships, yachts, etc.), subway terminals, or any location in which windows are desirable to enhance lighting and user experience within the environment. Although an artificial window consistent with the present disclosure may be provided in a wide variety of configurations, for ease of illustration and description embodiments consistent with the present disclosure may be described herein in connection with one or more specific embodiments. The descriptions provided herein are not intended to be limited to any number or configuration of displays or lighting panels.

Various embodiments disclosed herein are directed to detecting an obscured portion of a display screen and/or light panel and causing the obscured portion to transition to a low-power mode. In the context of a display screen, low-power refers to the obscured portion being driven at zero or a non-zero power to cause the same to consume less overall power relative to other portions, e.g., the remaining unobscured portions, of the display screen operating at normal power. Some specific, non-limiting examples of a low-power mode at a non-zero power includes dimming a backlight, reducing a refresh rate, and/or presenting a static image frame (e.g., of solid black). Operating in a low-power mode at zero power can include switching the obscured portion "off." In the context of a light panel comprising a plurality of light sources, e.g., LEDs, a low-power mode with a non-zero power can manifest as reducing power of a driving signal, e.g., current and/or voltage, and a low-power mode at zero power can include switching one or more light sources associated with the obscured portion "off."

Turning to the Figures, FIG. 1 shows a block diagram of an example artificial window system 1 consistent with aspects of the present disclosure. The example artificial window system 1 is shown and described below as delineated into two sections, namely building exterior and building interior, for simplicity and ease of explanation. However, the example embodiment of FIG. 1 is not intended to be limiting and components may be located inside or outside of given building/structure.

Continuing on, the building interior section of the artificial window system 1 includes a panel driver 2, one or more environmental sensors 9, one or more optical sensors 10, and one or more window panels 12. The building exterior section of the artificial window system 1 includes one or more optical sensors 14, a video interface 15, a camera device (or camera sensor) 17, and a user device 18. The exterior components may also be accurately referred to as exterior acquisition modules 19.

The panel driver 2 can include a housing 20. The housing 20 may be a single housing, e.g., to co-locate associated components, or a plurality of housings depending on a desired configuration. The housing 20 may be integrated into the frame/housing of the panels 12 or may be implemented in a separate housing. As shown, the housing includes a controller 3, an optional power management controller 5, and an optional environmental controller 6.

The controller 3 comprises at least one processing device/circuit such as, for example, a digital signal processor (DSP), a field-programmable gate array (FPGA), Reduced Instruction Set Computer (RISC) processor, x86 instruction set processor, microcontroller, an application-specific integrated circuit (ASIC). The controller 3 may be implemented, for example, using software (e.g., C or C++ executing on the controller/processor 104), hardware (e.g., hardcoded gate level logic or purpose-built silicon) or firmware (e.g., embedded routines executing on a microcontroller), or any combination thereof.

The controller 3 may further include a memory (not shown). The memory may comprise, for example, volatile and/or non-volatile memory. The memory may include operational settings/parameters such as fans speed, heating/cool modes, aromatic selection properties, scheduling, voice recognition profiles, and/or face recognition profiles. Each of the operational settings may be adjusted remotely via an "app" executed on the user device 18, for instance.

The power management controller 5 and the environmental controller 6 may be implemented as separate chips/circuits, or may be at least partially implemented by the controller 3. The power management controller 5 may be configured to transition at least a portion of the panels 12, and in particular the display panel and/or light panels associated with each of the panels 12, into a low-power mode as discussed in greater detail below. The power management controller 5 may be coupled to an occupancy sensor, e.g., provided by environmental sensors 9, and may transition all or portion of the window panels 12 into a low-power mode when no active users are detected (e.g., based on a lack of movement) within the room after a predetermined amount of time. The environmental controller 6 may be utilized to communicate with a heating, ventilation and air conditioning (HVAC) system of a building to adjust cooled or heated air into a surrounding environment.

Each of the window panels 12 can include one or more display panels and one or more lighting panels, as discussed in greater detail below. Each of the lighting panels may include groups of light sources, e.g. light emitting diodes (LED), supported on a frame and covered by a diffusing panel. The controller 3 may provide lighting control signals to the lighting panels to energize the light source to establish an overall light output of the light panels that mimics outdoor lighting conditions, e.g. the lighting conditions at the location of the camera.

Any artificial window consistent with the present disclosure may include other features or combination of features. For example, the each window panel can include a display for displaying X-rays and other information, or mirroring from a portable electronic device such as a phone or user device 18, e.g. using an application such as Airplay. The display may be portable, foldable or rollable, may be a projection screen, a mico-pixellated LED screen, a laser projection screen, a holographic projection screen, or may be configured using a sensor on coupled to the system or wearable by a person (such as using a bracelet or necklace) to allow for a parallax image that moves as the viewer moves. Also, a single image may be across multiple display panels (to mimic a large multi panel window), and the output of the camera may be buffered before displaying the video to eliminate any loss of image on screen if camera signal is lost.

The lighting panels may be include multi-frequency LEDs panel to provide full spectrum light output from the panels, e.g. from UV to IR wavelengths. Also, the panels may include light sources configured to produce vitamin D in humans. Individual light sources or groups of light sources within the panels may be energized to produce a shadowing effect (directed and dynamic light) and/or funneled light to mimic sunlight coming through a skylight. The light panels be networked using a Digital Addressable Lighting Interface—DALI protocols, or other application such as Wattstopper.

In one embodiment, the controller 3 may be configured to store the output of the camera 17 and extract outdoor lighting information from the output of the camera representative of the intensity and color temperature of the outdoor lighting conditions in the area of the camera 17. The controller 3 may be configured to provide a light control signal to the panels 12 in response to the extracted outdoor lighting information to energize the light sources in the panels 12 to establish an overall light output of the light panels that mimics the outdoor lighting conditions.

The system 1 may also include one or more interior optical sensors 10. The interior optical sensor 10 be positioned for sensing the light output of the panels 12. An output signal of the interior optical sensor 10 is coupled to the controller 3 as a lighting control feedback signal 8 and is representative of the intensity and color temperature of the output of the panels 12. The controller 3 maybe configure to adjust the lighting control signal(s) to the panels 12 in response to the lighting control feedback signal 8 to mimic the outdoor lighting conditions as determined from the output of the camera or the exterior optical sensors 14.

Alternatively, or in addition, outdoor lighting conditions in the area of the camera may be obtained using one or more exterior optical sensors 14. The exterior optical sensor 14 may be a known photo sensor or group of sensors configured to provide an output representative of the intensity and color temperature of the outdoor light. The controller 3 may be configured to provide a light control signal via signal 11 to the panels 12 in response to the output of the sensor 14 to energize the light sources in the panels 12 to establish an overall light output of the light panels that mimics outdoor lighting conditions.

The optical sensors, e.g., interior/exterior optical sensors 10/14, in a system consistent with the present disclosure may be wireless. Also, sensors may be coupled to the system 1 for providing fall detection, monitoring of vitals (breathing, heart rate, etc.), environmental detection (CO, temperature, humidity, ambient light), pathogen detection (i.e., MRSA, Norovirus) and/or occupancy detection via environmental sensor 9. Also, output sensory devices (not shown) may be provided to allow a user to feel wind (e.g. using a fan), snow, mist, etc. depending on the outdoor conditions. One example artificial window configuration capable of producing simulated airflow representative of outdoor air flow based on such output sensory devices is shown and described in greater detail with reference to FIG. 10. A microphone and speakers may be added to the system to provide audio input/output. The output audio may be simulated audio or recorded from an outdoor environment, e.g., live audio. The input audio may be utilized by the controller 3 to execute voice commands, e.g., "turn off window", "open window", "lower window volume."

Existing features of a television, such as microphone, speakers, 3D, camera, may be provided in the system 1 by one or more of the window panels 12. The system may be configured to provided light output that adjust for adjust for seasons to extend Daylight Standard Time and or adjust for travel related light adjustments, e.g. from a long flight.

The camera 17 may include, for example, one or more image sensors/cameras. For example, the one or more image sensors may output color image data (RGB), color and depth image data (RGBD camera), depth sensor information, stereo camera information (L/R RGB), YUV, infrared signals, and so on. In one example, the camera 17 includes a first image sensor configured for capturing an image signal (e.g., color image sensor, depth-enabled image sensing (RGDB), stereo camera (L/R RGB), YUV, infrared, and x-ray) and a second image sensor configured to capture image data different from the first image sensor. The camera may be any a known video camera configuration, such as a wireless camera, and may be positioned anywhere. Live video feeds may also be received from any publicly available camera feed, using Internet accessible camera feeds.

In one example, the camera 17 is implemented by the user device 18, thus allowing a user to select the particular scene/environment to capture using a camera provided by their personal device. In some cases, the user device 18 may be optionally used adjacent the panels 12. The user device 18 may couple to the panels 12, e.g., wireless, and/or may be 'docked' to the panel driver using a physical interconnect. The user device 18 may then output stored video to the panels 12 by way of the panel driver using, for instance, Miracast or other video sharing technology. The video supplied by the user device 18 may be local recordings or recordings downloaded/streamed from a wide area network, e.g., the Internet. A system consistent with the present disclosure may also not use a camera with a live video output, e.g. video may be stored in a memory of the panel driver 2, for instance, and sent to the screen and or provided from an animation. The video may be of previously recorded outdoor settings, e.g., a sandy beach, a city scape, and so on, and the panel driver 2 may extract lighting information to replicate/mimic the light condition present in those outdoor settings (e.g., without necessarily utilizing an optical sensor such as optical sensor 14) when recorded, as discussed in further detail below.

In operation, the camera 17 captures a plurality of image frames for a field of view (FOV) 16. The camera 17 then outputs the image frames via a video signal 21 to a video interface 15. The video interface 15 may be coupled to a plurality of cameras, although only a single camera 17 is shown. The video interface 15 may convert the image frames from the camera 17, e.g., analog to digital, although the camera 17 may output a digitized signal. In any event, the video interface 15 may then output video signals 23 to the panel driver 2. The output video signals 23 may be Ethernet packets or other suitable format.

The controller 3 may include a video converter 4, such as a network video recorder (NVR), configured to receive the video signals 23 and convert the same into a video output signal having a desired format, e.g. an HDMI format, for providing an output on the panels 12. The panel driver 2 can include a network interface circuit (not shown) with an associated antenna device 7 for transmitting the video via output signal via signals 11. Note the signals 11 may not necessarily be wireless, as shown, and instead may be a wired connection. The panels 12 may each also include a network interface circuit (not shown) with an associated antenna device 13. The panels 12 may then receive the signals 11, and in response thereto, output at least a portion of the image frames received via signals 11. The window panels 12 can generally depict an outdoor scene within FOV 16 within the display of the panels 12 to provide a simulated/synthetic window.

The system 1 may provide data security features to allow data to be sent and received by the system in a secure fashion. The system 1 may also include remote login and diagnostic access and may provide alerts, emails, texts when malfunction occurs or is about to occur. The system may provide 2-way video communication through use of a camera within the room were the window is installed and may provide a social media interface.

Power to the system 1 may be provided through conventional line power or wirelessly. Light from the lighting panels may be used to power other electrical equipment. A mobile application running on a mobile device may be used to turn the device on/off, to control views from the camera (i.e., similar to IC Realtime App) and/or adjust window settings.

A system consistent with the present disclosure may be used for example to promote personalized health, e.g. through use of lighting from the lighting panels, in recording studios (display panel act as a mirror, camera records the act, LED panel changes light frequency and intensity to record the act under different lighting conditions), in gaming, virtual reality, augmented reality (e.g., 3D projection from screen onto floor/into room for use in physical therapy, dance revolution), and in other configurations such as a building or vehicle skylight. The system may also include diagnostics and configuration software.

Figure 2:
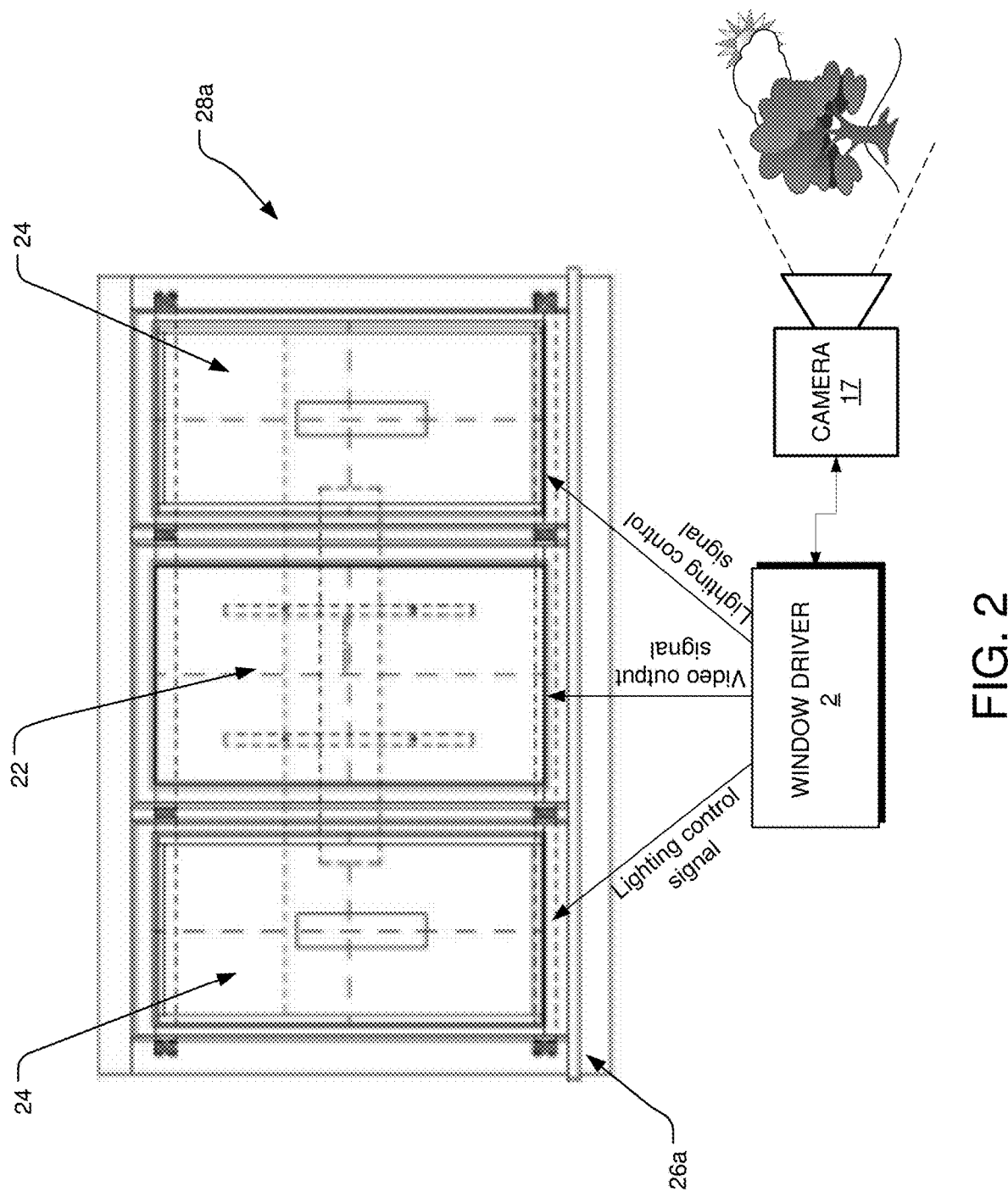
FIG. 2 shows another embodiment of the artificial window system of FIG. 1 consistent with the present disclosure.

FIG. 2 shows a perspective view of an embodiment 20a of the artificial window system 1 shown in FIG. 1. The embodiment 28a shown in FIG. 2 includes a display 22, first and second lighting panels 24, a window frame 26a, a window driver 2 and a video camera 17. In general, the output of the camera 17 is coupled to the controller 3 of the window driver 2, which converts the output to a video output signal coupled to the display 22. In response to the video output signal from the window driver 2, a video image captured by the camera 17 is shown on the display 22.

Figure 3:
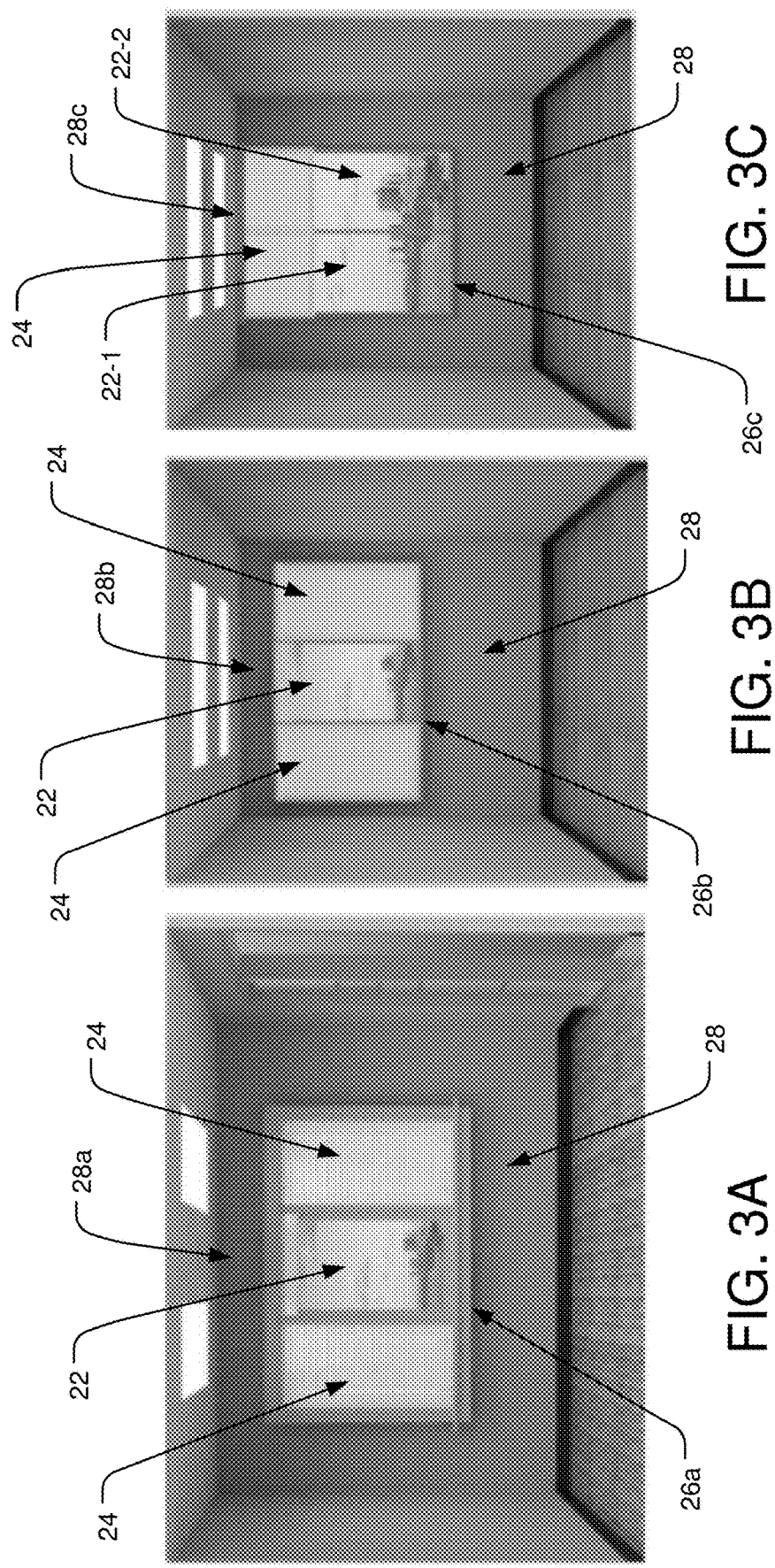
FIGS. 3A-3C illustrate embodiments of an artificial window system consistent with the present disclosure.

FIGS. 3A-3C are a simplified views of artificial windows 28a, 28b, and 28c consistent with the present disclosure. With additional reference to FIGS. 1 and 2, an artificial window 28a consistent with the present disclosure includes at least one video display panel 22 disposed in a window frame 26a mounted on a wall of a room, e.g. a room of a building or vehicle. The artificial window 28a may also include one or more lighting panels 24. The lighting panels 24 may be configured to mimic outdoor lighting conditions at the location of the camera providing video the video signal to the display. The lighting panels 24 may also be disposed in the window frame 26. The display and lighting panels 24 may be at least partially covered by interior blinds (or window covering) of the type typically used on actual windows. As discussed in further detail below, the window covering may be used to advantageously reduce power consumption during operation.

An artificial window consistent with the present disclosure may include any number of displays and lighting panels in a variety of configurations. FIG. 3B, for example illustrates an embodiment 28b having a single display 22 and two lighting panels 24, disposed in a differently styled frame 26b compared to FIG. 3A. FIG. 3C illustrates an embodiment 28c including two displays 22-1 and 22-2 and a single lighting panel 24 disposed above the displays. In the embodiment of FIG. 3C the video image of an outside environment is stitched so that it stretches across the two displays. Alternatively, the two displays 22-1 and 22-2 may be configured as a single display with a window trim portion extending down the middle thereof to give the appearance of two displays with stitched video when there is only a single display with a window trim portion.

Figure 4:
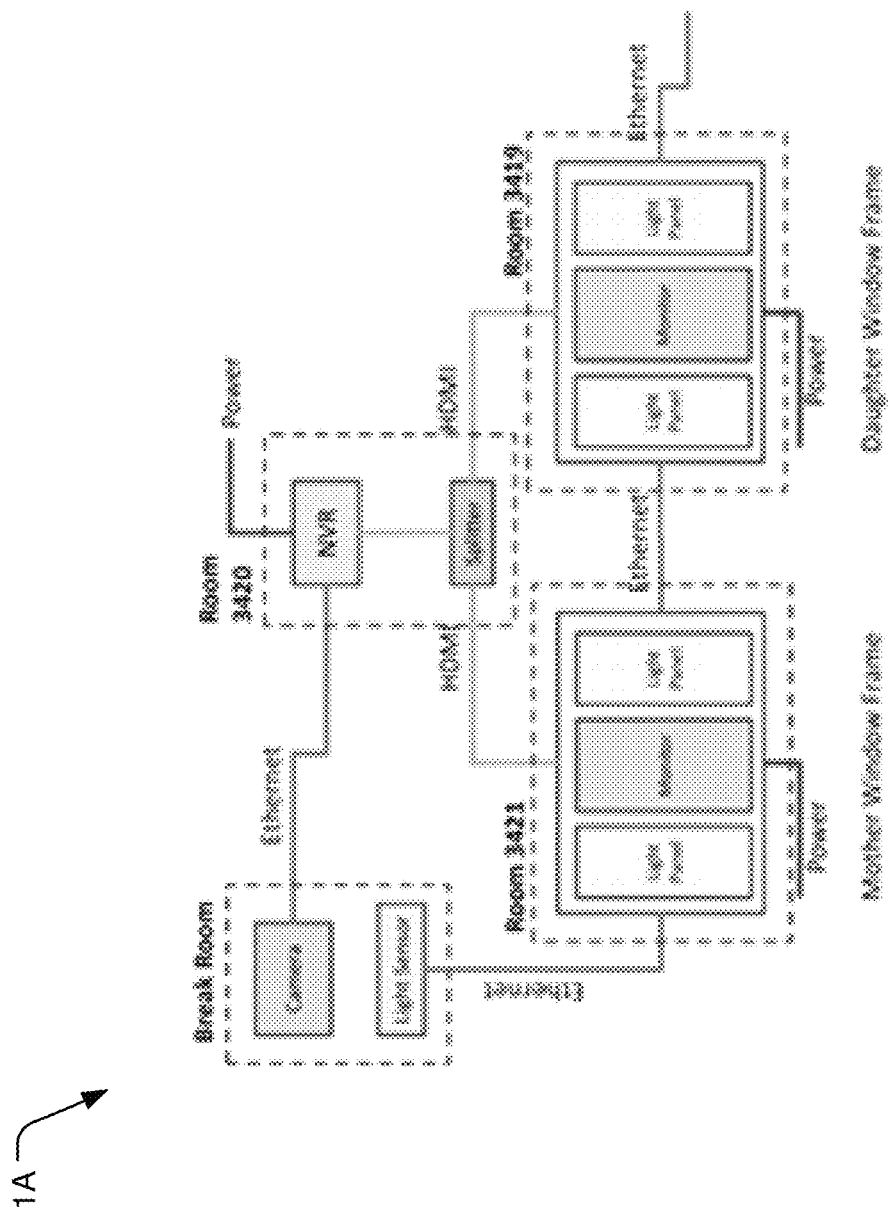
FIG. 4 illustrates another embodiment of an artificial window system consistent with the present disclosure.

Multiple artificial windows consistent with the present disclosure may be provided in a single location, e.g. building or vehicle, and each may include an associated camera and display to display distinct images for each display, or multiple artificial windows consistent with the present disclosure may be combined into a single system, e.g. a networked system, to include a display that displays a common image. FIG. 4, for example, illustrates a system 1A including first and second artificial windows consistent with the present disclosure, e.g. in separate rooms of the same facility (rooms 3421 and 3419 in the illustrated embodiment) In the illustrated embodiment a single camera is provided, e.g. in a break room window. The video output is coupled to an NVR in a common controller for the windows and converts the camera output to an HDMI signal that is split to the respective artificial windows. A light sensor for sensing outdoor lighting conditions in the location of the camera provides an output to the windows via an Ethernet network connection for causing the light panel in the windows to emit light that mimics the outdoor lighting.

Figure 5:
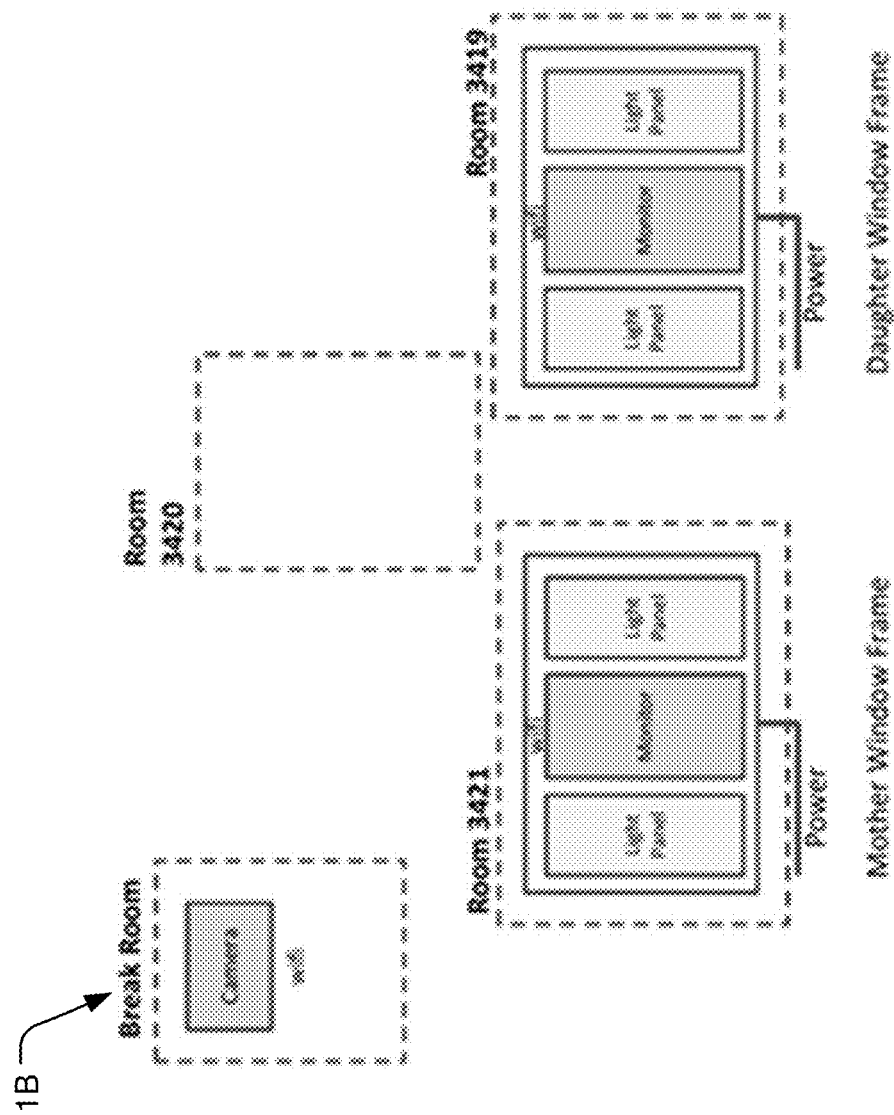
FIG. 5 illustrates another embodiment of an artificial window system consistent with the present disclosure.

FIG. 5 illustrates another embodiment of an artificial window system 1B including first and second artificial windows consistent with the present disclosure, e.g. in separate rooms of the same facility (rooms 3421 and 3419 in the illustrated embodiment). In the illustrated embodiment a single camera is provided, e.g. in a break room window. The video output of the camera is coupled wirelessly, e.g. through a Wi-Fi connection, to the respective windows. The video output of the camera may be processed in a cloud application and/or locally in a controller at the windows to convert the signal to a format, e.g. HDMI, for display on the display/monitor of the windows. The video output of the camera may also be proceeds in a cloud application and/or locally in a controller at the windows to extract outdoor lighting information representative of the intensity and color temperature of the outdoor light in the area of the windows. In response to the lighting information a lighting control signal may be provided coupled to the panels for causing the panels to emit light that mimics the outdoor lighting conditions viewed by the camera. The configuration of FIG. 5 allows reduce wiring complexity, cost, installation effort and maintenance cost compared to the configuration of FIG. 4.

Figure 6:
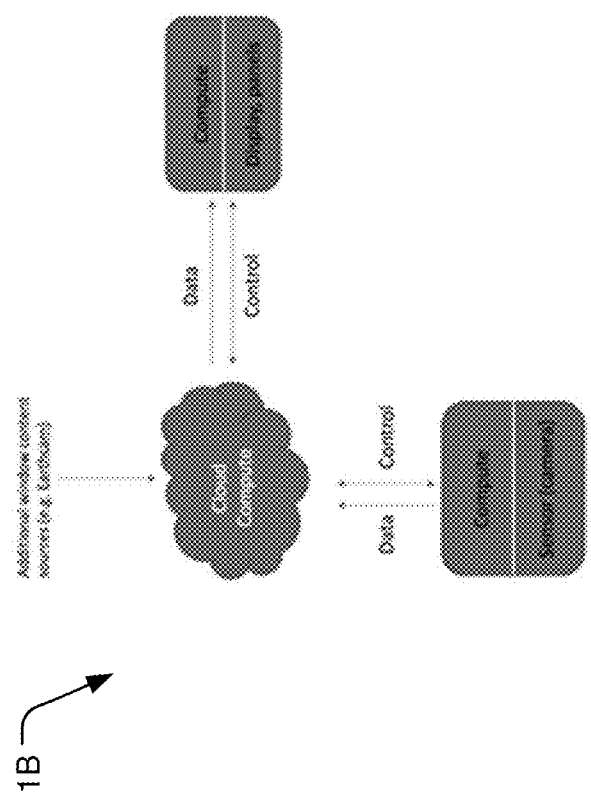
FIG. 6 illustrates an embodiment of an artificial window system consistent with the present disclosure.

FIG. 6 diagrammatically illustrates an embodiment of the architecture for the system 1B shown in FIG. 5. FIG. 6 shows a camera/sensor portion and a display/panels portion, each of which may have computing capability, e.g. for extracting lighting information from the video output of the camera and/or converting video output to a format that may be displayed on the display. Video data may be provided from the camera/sensor to a cloud computing environment, e.g. a remote server or servers, and video and lighting data may be provided form the cloud computing environment to the display and panels. Control commands may be bi-directional between the cloud computing environment and the sensor/camera and/or the display and panels. Additional content for display on the display of the artificial window(s) may be provided to the cloud computing environment from other sources, e.g. local or remote cameras such as Earth-cam, etc. The video from these other sources may be provided in from the cloud computing environment for display on the display(s) either in addition to, or in place of, the video output of the camera.

Figure 7:
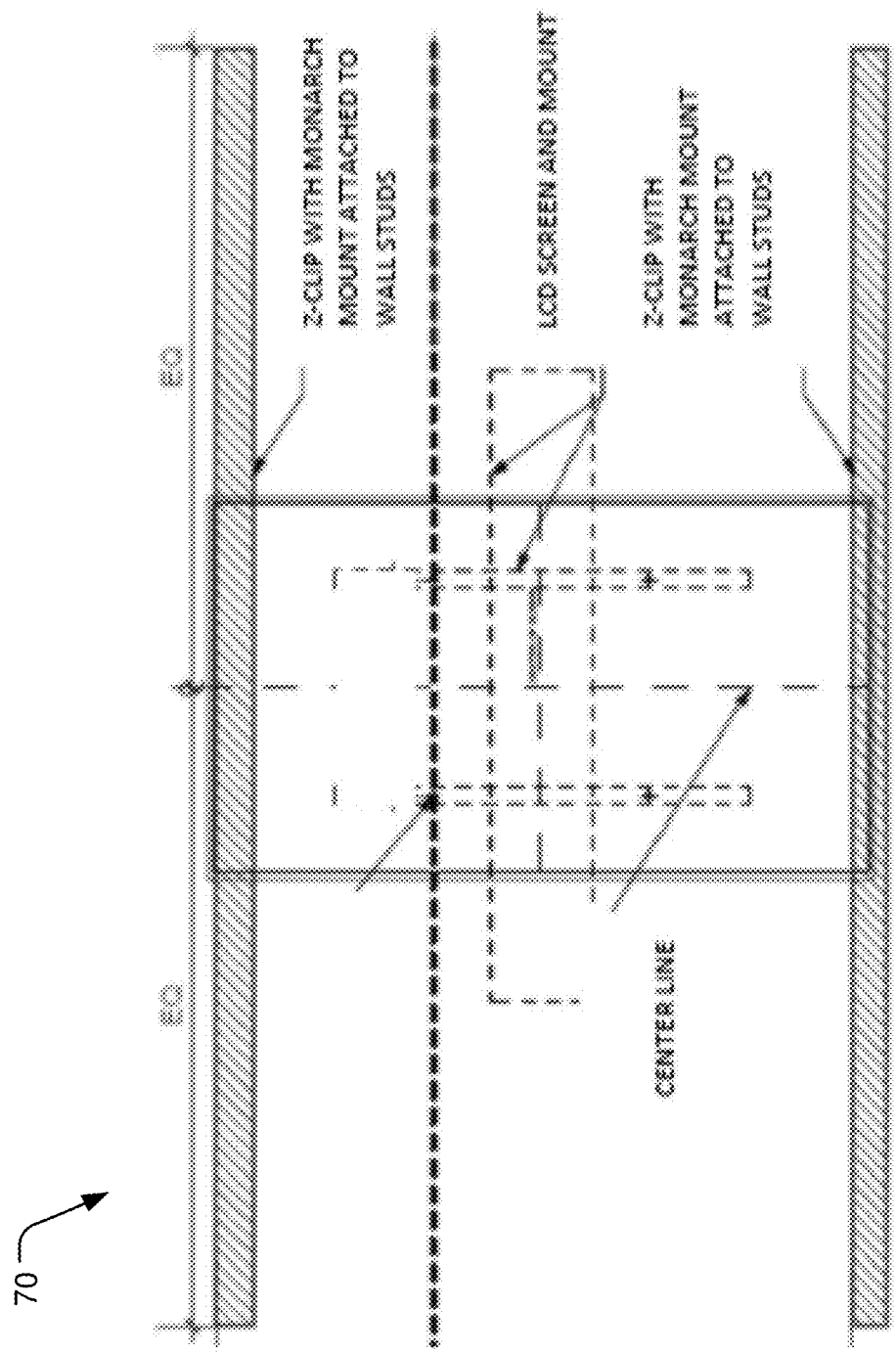
FIG. 7 illustrates an embodiment of an artificial window system consistent with the present disclosure.
Figure 8:
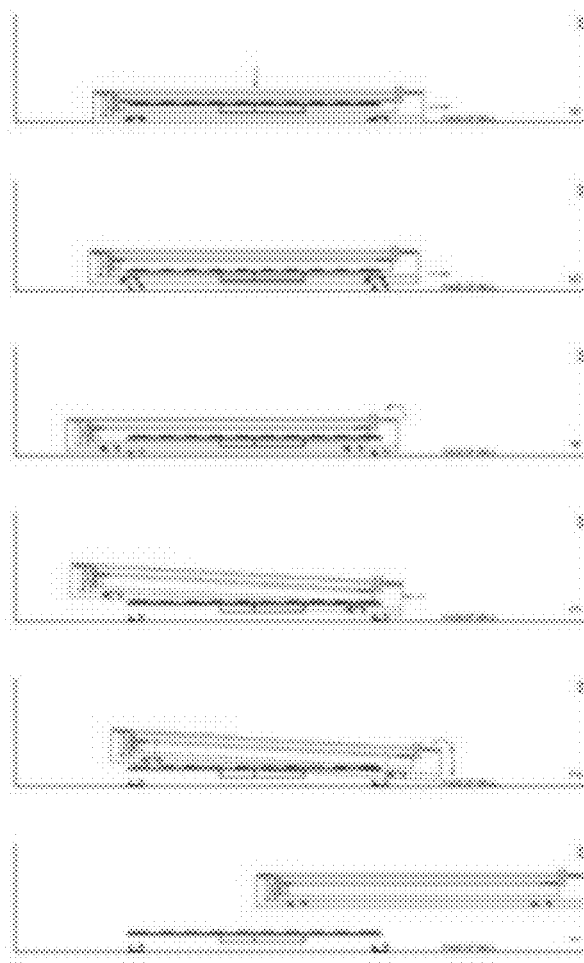
FIGS. 8A-8F illustrate steps of one embodiment of a mounting method for an artificial window system consistent with the present disclosure.

An artificial window consistent with the present disclosure may be mounted to a wall using any of a variety of means, and may be configured to be recessed within the wall. For example, an interior wall may be constructed with typical window wall framing that may support the window in the wall. FIG. 7 diagrammatically illustrates a mounting system 70 consistent with the present disclosure. The illustrate embodiment includes clips, e.g. Z-clips, coupled to the top and bottom of the frame of the artificial window and corresponding mounts, e.g. monarch mounts coupled to the wall. FIGS. 8A-8F illustrate a mounting process consistent with the present disclosure in the sequence shown in steps illustrated adjacent FIG. 8F.

Figure 9:
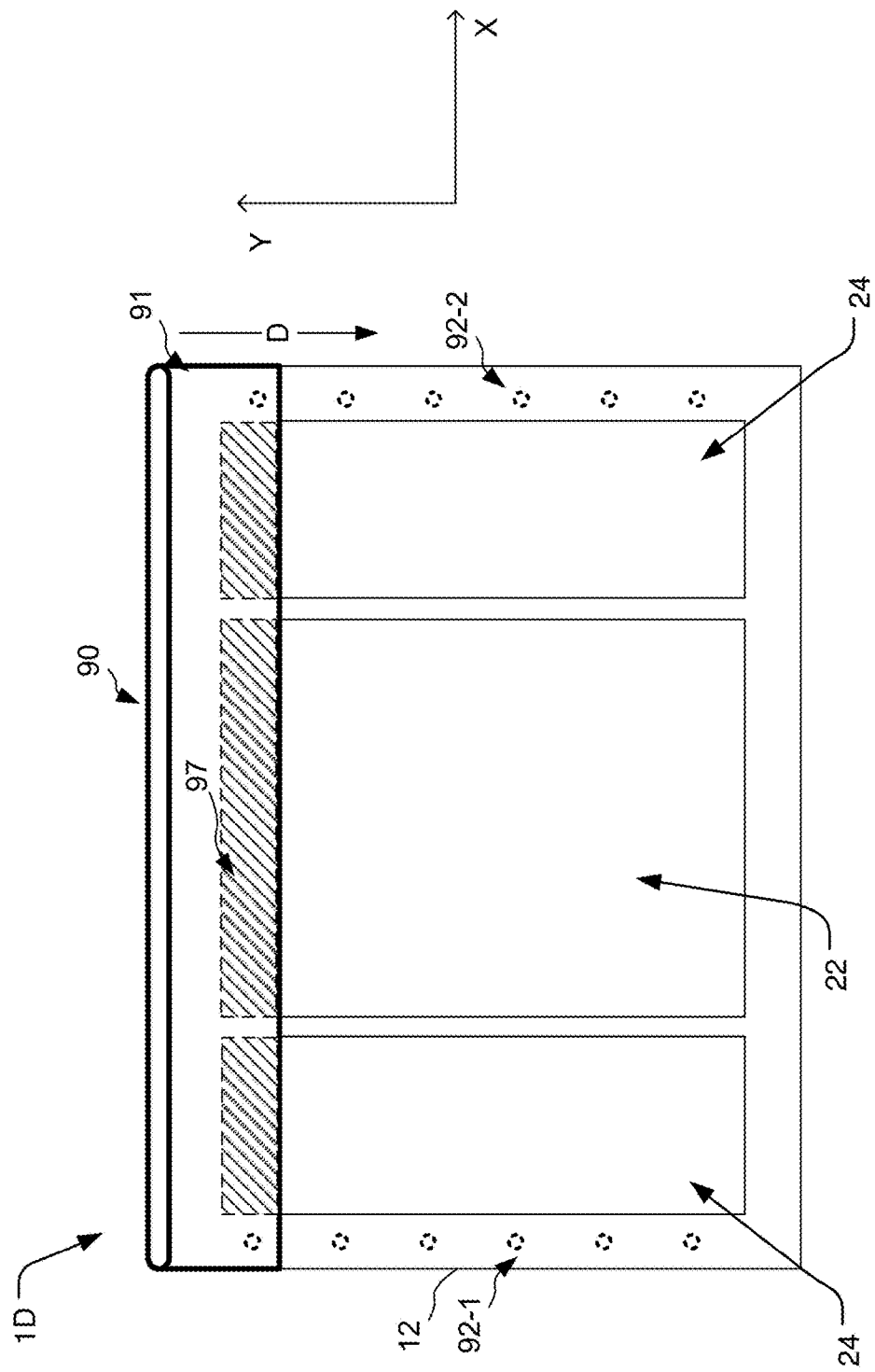
FIG. 9 illustrates an embodiment of an artificial window system having a power-saving window covering consistent with the present disclosure.

FIG. 9 shows an example embodiment of the artificial window system 1D consistent with an embodiment of the present disclosure. As shown, the embodiment of FIG. 9 includes a window panel 12 having a first and second light panels 24 and a display panel 22 disposed there between. Although the window panel 12 is shown and described as window, this disclosure is not limited in this regard. The window panel 12 may be implemented by, for instance, a medical instrument, kiosk, virtual reality headset or other equipment.

In addition, the window panel 12 includes a window covering shown as blind/shade device 90. Although a shade device is shown and described, this disclosure is equally applicable to any type of window covering such as drapes, shutters, vertical blinds, horizontal blinds, for example. The shade device 90 includes an extendable portion 91 that may be drawn to cover/obscure at least a portion of the window panel 12. The shade device 90 may be semi-transparent, e.g., permit at least 10% or more of light or more to pass through, or may be opaque, e.g., permitting 0% to 5% of light to pass through. Note, a transparent cover, e.g., glass, acrylic or other suitable material, may be disposed over window panel 12 and by extension the shade device 90. This may advantageously reduce the amount of dust and debris that collects on the surfaces of the shade device 90.

In accordance with an embodiment, drawing the extendable portion 91 can cause at least a portion of the first and second light panels and/or the display panel 22 to be switched off or to otherwise enter a low-power mode by the power management controller 5. In one example, a first plurality of proximity sensors 92-1 may be disposed along the frame of the window panel 12. Optionally, a second set of proximity sensors 92-2 may be disposed opposite the first plurality of proximity sensors 92-1. The proximity sensors 92-1, 92-2 may utilize a light sensor or any other suitable sensor for detecting the presence of the extendable portion 91 of the shade device 90 or lack thereof, as the case may be. The proximity sensors can prove a signal to the power management controller 5 (or controller 3) to indicate the position of the extendable portion 91 of the shade 90.

In response to the power management controller 5 detecting the shade being drawn, e.g., based on the signals from the first and/or second plurality of proximity sensors 92-1, 92-2, the power management controller 5 may then cause a region 97 of the first and second light panels and/or the display panel 22 to enter a low-power mode, or to shutoff to reduce power consumption. Note, the second plurality of proximity sensors 92-2 may be used in tandem with the first plurality of sensors 92-1 to avoid false positives and to provide the controller 3 with a higher confidence as to the position of the shade. For instance, the power management controller 5 may require that each sensor of sensors 92-1 and a corresponding sensor of sensors 92-2 register the presence of the shade device 90 before considering the shade drawn. In addition, the power management controller 5 may utilize the output from multiple sensors disposed along a the same vertical axis X in sequence to ensure that each successive sensor is registering the presence of the shade device 90. To this end, the bottom-most sensor may be covered based on, for instance, the presence of a potted plant or a person's body, but the power management controller 5 may simply ignore the signal from the inadvertently obstructed sensor based on the other sensor(s) not registering the presence of an object. Thus, the shade device 90 may be distinguished from other objects that momentarily trigger detection by the sensors 92-1, 92-2.

Note, other approaches may be used to determine the position of the shade 90 and this disclosure is not necessarily limited to proximity sensors. For instance, the shade 90 may include an encoding device such as a Hall effect quadrature encoder, rotary encoder, potentiometer (e.g., resistance changes based on distance the shade is extended), optical encoder, or other similar devices that can translate a mechanical position into a proportional electrical signal.

As shown in FIG. 9, the shade 90 was drawn along direction D resulting in the region 97 of the first and second light panels 24 and the display panel 22 becoming obscured. The controller 3 by way of the power management controller 5 may then turn-off or otherwise cause LEDs associated with the obscured region 97 to enter a low-power mode while leaving the remaining, unobscured portions at a normal power. Alternatively, or in addition, the controller 3 may cause pixels associated with region 97 to enter a low-power mode or switch-off. The low-power mode may include reducing backlight power, reducing a refresh rate, and/or outputting a static black rectangle or other image that limits the necessary amount of power to drive the pixels associated with region 97. In some cases, the display panel 22 may comprise a plurality of independent display panel segments stitched together or otherwise collectively used to provide a single display. In this case, each display panel segment within region 97 may be switched off or put into a low-power mode.

In any event, the shade 90 may therefore be utilized to reduce the amount of light being emitted into a room, similar to shades of conventional windows. In addition, the shade 90 may be utilized by the artificial window system 1 to reduce power consumption during use. In some cases, the power reduction may be proportional to the position of the shade 90. For instance, the shade 90 being drawn over 25% of the window panel 12 may result in about a 25% reduction of power consumption. Likewise, the shade 90 being drawn over 50% of the window panel 12 may result in about a 50% reduction of power consumption.

Note, in some cases the shade 90 may not necessarily cover/obscure the first and second light panel 24. For instance, the shade 90 may be configured to only obscure the display panel 22 and not the adjacent light panels. In this case, the position of the shade 90 may cause covered/obscured portions of the display panel 22 to enter a low-power mode or otherwise be turned off as described above. In addition, the controller 3 may also cause the first and second light panels to output light at a lesser intensity and/or may turn off LEDs/light sources that correspond with the position of the shade 90 although the first and second light panels remain visible, i.e., not covered by the extendable portion 91. Therefore, the shade 90 may be utilized as a dimmer to adjust light output based on a desired illumination level.

In an embodiment, the shade 90 is a virtual shade that may be displayed by the display panel 22. The display panel 22 may be touch-sensitive to translate user input into commands. In this embodiment, a user may extend/retract the shade 90 by providing a touch gesture to raise/lower the extendable portion 91.

Figure 10:
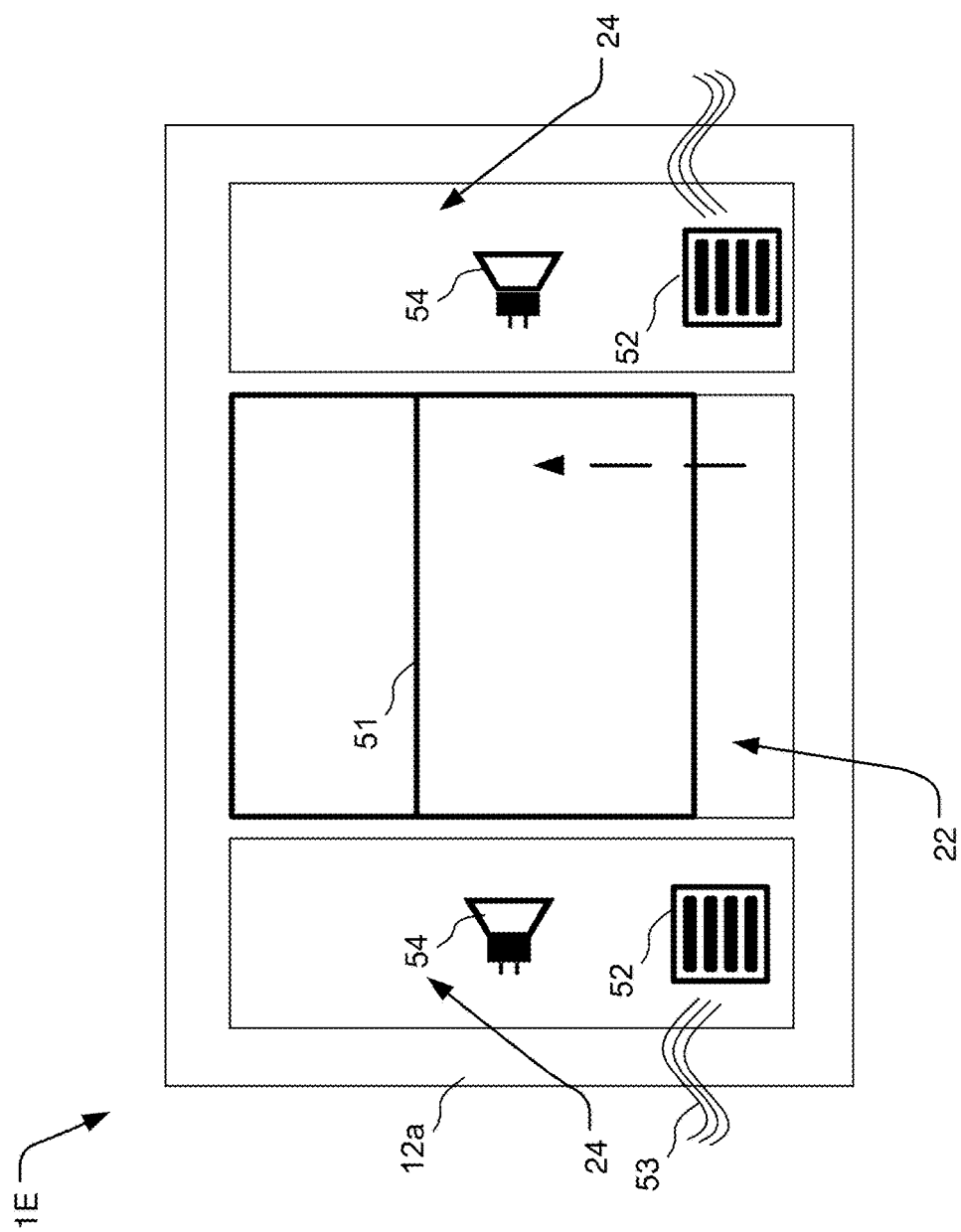
FIG. 10 illustrates an embodiment of an artificial window system consistent with the present disclosure having a slidable portion to adjust light output, sound, and/or airflow.

FIG. 10 shows another example embodiment of the artificial window system 1E consistent with an embodiment of the present disclosure. As shown, the display panel 22 of the window 12a includes a sash portion 51 that approximates the look and feel of a sash of a traditional window. The sash portion 51 may be moveable based on a track to allow a user to raise/lower the sash. The sash portion 51 may be virtual, e.g., presented by the display panel 22, or may be a separate piece that may be mechanically raised/lowered. The window 12a may further include vents 52 to output air 53, and/or speaker devices 54.

The vents 52 may be configured to output air 53 based on a signal from the controller 3. In other cases, the vents 52 are coupled to the heating, vitalization, and air conditioning system (HVAC) of a building to provide heated air, cooled air, or air from outside of the building.

In an embodiment, transitioning the sash 51 from a closed position to an open position (e.g. as shown in FIG. 5) can cause varying amounts of air to be output by vents 52. For instance, the controller 3 may detect the position of the sash 51, e.g., using a potentiometer or encoder discussed above, and provide a signal to cause the vents 52 to output a predefined flow of air, e.g., via environmental controller 6. In instances where the sash 51 is fully-opened, the controller 3 may provide a signal for a maximum airflow, e.g., 100% output, and in the half-opened position the controller 3 may provide a signal for half airflow, e.g., 50% output. In contrast, the sash 51 in the closed position may turn off air flow via the vents. The air 53 output by the vents may be warmed/cooled, e.g., based on the HVAC system of the building. In some cases, the air 53 may be air that is brought in via ducts and not filtered or otherwise conditioned. This may result in the air 53 having qualities similar to those of outside air including moisture content and smell.

Likewise, raising/lowering the sash 51 may cause the controller 3 to adjust volume of audio produced/emitted via speakers 54. The audio produced by the speakers 54 may include natural sounds, e.g., live audio as recorded outside of the building, pre-recorded nature sounds, ocean sounds, and so on, or may include computer-generated sounds and music.

Accordingly, the window 12a may output a varying amount of sound and/or air flow based on the position of the sash 51. This may advantageously allow an artificial window consistent with the present disclosure to act, in a general sense, like a conventional window that permits a user to open the window to allow in outside air and sounds.

Figures 11A, 11B:
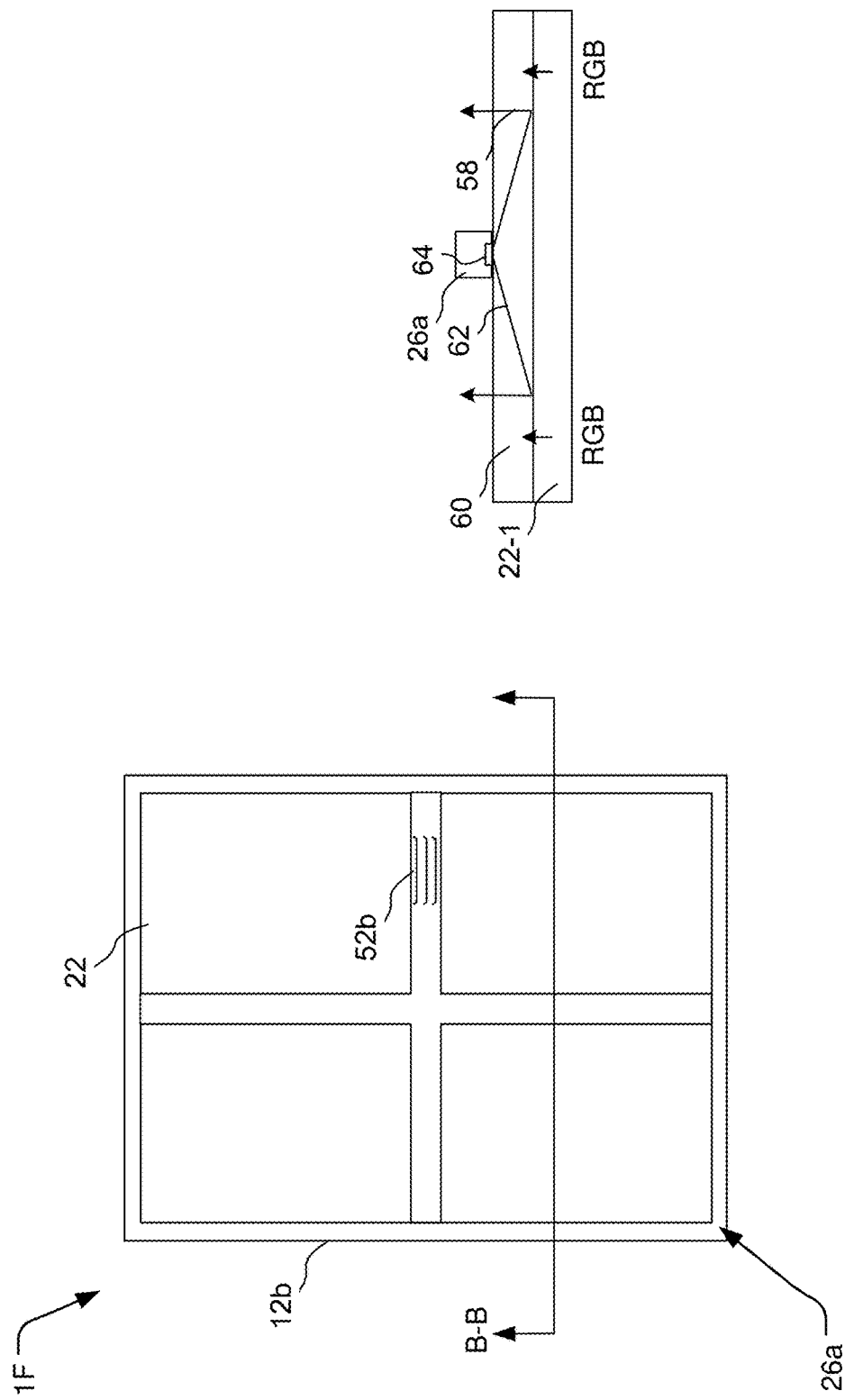
FIG. 11A illustrates another example embodiment of an artificial window consistent with the present disclosure.
FIG. 11B shows an example cross-sectional view of the artificial window of FIG. 11A taken along line B-B.

FIG. 11A shows another example embodiment of an artificial window system 1F consistent with an embodiment of the present disclosure. As shown, the window panel 12b includes a frame 26a. The frame 26a allows for a modular configuration to allow ease of transport and installation and to allow different window frame layouts made of modular panels (e.g., 2 panel 1 screen, 1 screen 1 panel above (transom), 2 panel 2 screen, etc.).

The frame 26a may also include connected air passages (not shown) for cooling and heat-generating features as discussed above with regard to FIG. 10. The air passageways may be connected with the vents 52 (FIG. 10) or the vents 52b disposed along the frame 26a. One or more cooling fans may be coupled to force air through the cooling air passages, e.g. in response to an over temperature condition sensed by a thermal sensor. A recess may be provided in the frame to allow connections of shades or vertical blinds over the lighting panels, e.g., shade 90, with or without use of a diffusing panel positioned over the light sources in the lighting panels.

FIG. 11b shows an example cross-sectional view of the window panels 12b of FIG. 11A taken along B-B. As shown, the window panel 12b includes a display panel layer 22-1, and a transparent layer 60 coupled to the display panel layer. The display panel layer 22-1 may include pixels for outputting wavelengths associated with RGB (red-green-blue) color values, for instance. The transparent layer 60 may permit a substantial portion of incident light, e.g., up to and exceeding 80% of incident light, to pass through. The frame 26a may include a cavity with a plurality of light emitting diodes 64 or other light sources disposed therein to emit light 62 towards the display panel layer 22-1. Based on the angle of the light 62 and the index of refraction between the medium of the layer 60 and the medium of the layer 22-1, a substantial portion of the light 62 may refract outwards along a path substantially transverse to the surface defining the transparent layer 60. Stated differently, total internal reflection may be used to provide a light path for light 62 that allows the light sources 64 to indirectly illuminate a surrounding environment. Therefore, the light 62 may appear to users to emit from the display panel 22 to provide an in-line illumination along with the video/images presented by the display panel 22.

Note, as discussed above, a shade (either virtual or physical) may be used to cause a window consistent with the present disclosure to transition regions of the display panel and/or light panels into a low-power mode. In similar fashion, the same approach may be used with the in-line illumination via the frame 26a to switch off LEDs or otherwise reduce output power for sections of the frame 26a obscured by the shade 90.

In an embodiment, the display panel layer 22-1 and the transparent layer 60 may comprise a dual-screen configuration. In this embodiment, the display panel layer 22-1 may comprise a first type of display, e.g., an OLED display, and the transparent layer 60 may comprise a second type of display, e.g., a Film compensated Super Twisted Nematic (FSTN) LCD, although other display types may be suitable such as a TN LCD device. The frame 26a may be optionally disposed on the transparent layer 60. The display panel layer 22-1 may be switchably disabled, e.g., turned off, to utilize the low-power display provided by the transparent layer 60. This may advantageously reduce power while still allowing at least a portion of the window panel 12 to present information to users.

The base of the frame 26a may have an independent front fascia panel, and different window/panel shapes and configurations may be provided. Access panels for sensors and other features may be provided and the magnets may be used to secure parts of the frame, e.g. access panels in the front, to allow for access, service and maintenance. The window frame 26a may also be configured to overlay an existing window to improve the view provided by the window. The window may be mobile, e.g. by configuring a mobile device to display the image and provide a light output mimicking outdoor lighting conditions in separate portions of the display of the mobile device. The window may be implemented using a desktop computer by configuring a computer to display the image and provide a light output mimicking outdoor lighting conditions in separate portions of the display of the computer.

In accordance with an aspect of the present disclosure an artificial window system is disclosed. The artificial window system comprising a camera sensor for capturing a plurality of image frames representative of an outdoor environment, an artificial window device including at least a first display panel for displaying at least a portion of the plurality of image frames, a window covering, the window covering having a section to obscure a portion of the first display panel from user view, and a panel driver including a controller to receive a video signal and cause the first display panel to display at least a portion of the video signal, identify a region of the first display panel obscured from view by the window covering, and transition the identified region of the first display panel obscured from view by the window covering into a low-power mode.

In accordance with another aspect of the present disclosure an artificial window system is disclosed. The artificial window system comprising at least one display panel, at least one lighting panel coupled to the display, and a controller for extracting outdoor lighting information from a video signal, and providing a lighting control output signal in response to the outdoor lighting information to cause the at least one lighting panel to provide a light output mimicking outdoor lighting conditions represented in the video signal.

In accordance with an aspect of the present disclosure a computer-implemented method of power management for an artificial window having at least a first display panel and an associated lighting panel is disclosed. The method comprising receiving, by a controller, a signal indicating a region of the first display panel is obscured from user view, and sending, by the controller, a first signal to cause the first display panel to transition into a low-power mode, wherein transitioning to a low-power mode includes dimming a backlight associated with the region of the first display panel obscured from view.

It will be appreciated by those skilled in the art that any block diagrams herein represent conceptual views of illustrative circuitry embodying the principles of the disclosure. The functions of the various elements shown in the figures, including any functional blocks, may be provided through the use of dedicated hardware as well as hardware capable of executing software in association with appropriate software.

The term "coupled" as used herein refers to any connection, coupling, link or the like by which signals carried by one system element are imparted to the "coupled" element. Such "coupled" devices, or signals and devices, are not necessarily directly connected to one another and may be separated by intermediate components or devices that may manipulate or modify such signals. Likewise, the terms "connected" or "coupled" as used herein in regard to mechanical or physical connections or couplings is a relative term and does not require a direct physical connection. As used herein, use of the term "nominal" or "nominally" when referring to an amount means a designated or theoretical amount that may vary from the actual amount.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure, which is not to be limited except by the following claims.

What is claimed is:

1. An artificial window system comprising:
   a camera sensor for capturing a plurality of image frames representative of an outdoor environment;
   an artificial window device including at least a first display panel for displaying at least a portion of the plurality of image frames;
   a window covering, the window covering having a section to obscure a portion of the first display panel from user view; and
   a panel driver including a controller to:
      receive a video signal and cause the first display panel to display at least a portion of the video signal;
      identify a region of the first display panel obscured from view by the window covering; and
      transition the identified region of the first display panel obscured from view by the window covering into a low-power mode.

2. The artificial window system of claim 1, further comprising at least one position sensor to determine a position of the window covering relative to the first display panel, and wherein the at least one position sensor provides a signal to the controller to indicate the position of the window covering.

3. The artificial window system of claim 1, wherein the low-power mode includes dimming a backlight of the region of the first display panel obscured from view by the window covering.

4. The artificial window system of claim 1, the artificial window device further comprising at least one lighting panel disposed adjacent the first display panel to emit light into a surrounding environment.

5. The artificial window system of claim 4, wherein the controller is further configured to extract outdoor lighting information from the plurality of image frames, and providing a lighting control output signal in response to the outdoor lighting information to cause the at least one lighting panel to provide a light output mimicking outdoor lighting conditions viewed by the camera sensor in a manner synchronized with the plurality of image frames presented by the first display panel.

6. The artificial window system of claim 5, wherein the artificial window system includes an optical sensor to measure light output of the artificial window system, the light sensor outputting a signal to the panel driver, wherein the signal is representative of intensity and color temperature of the light output.

7. The artificial window system of claim 1, wherein the artificial window device is wirelessly coupled for receiving a video signal representative of the plurality of images frames captured by the camera sensor.

8. The artificial window system of claim 1, wherein the artificial window device includes a moveable section allowing for a user draw open or close the artificial window device, and in response to detecting the moveable section transitioning to an open position, the controller provides a signal to a heating, ventilation and air conditioning (HVAC) system to adjust airflow into a surrounding environment and/or a signal to cause audio to be emitted, the audio being representative of outdoors sounds.

9. The artificial window system of claim 1, wherein the first display panel includes a first display device and a second display device, the second display device being disposed on the first display device and being substantially transparent.

10. The artificial window system of claim 9, wherein the second display device is a low-power device relative to the first display device.

11. An artificial window system comprising:
   at least one display panel;
   at least one lighting panel coupled to the display panel;
   a controller for extracting outdoor lighting information from a video signal, and providing a lighting control output signal in response to the outdoor lighting information to cause the at least one lighting panel to provide a light output mimicking outdoor lighting conditions represented in the video signal; and
   a power management controller for selectively transitioning a region of the at least one display panel into a low-power mode based on detecting a region of the at least one display panel is obscured from user view.

12. The artificial window system of claim 11, further comprising:
   a window covering to allow a user to selectively obscure at least a portion of the at least one display panel; and
   at least one position sensor to determine a position of the window covering relative to the at least one display panel, and wherein the at least one position sensor provides a signal to the power management controller to indicate the position of the window covering relative to the at least one display panel.

13. The artificial window system of claim 11, wherein the power management controller selectively transitions a region of the at least one lighting panel into a low power mode based on a position of the window covering.

14. The artificial window system of claim 11, wherein the video signal is provided by a mobile computing device, and wherein the video signal comprises a downloaded video file, a video previously recorded by the mobile computing device, or a live video from a camera sensor of the mobile computing device.

15. The artificial window system of claim 11, wherein the at least one display panel comprises at least a first display device and a substantially transparent layer disposed over the first display device, and wherein a frame portion is disposed over the transparent layer, the frame portion including a cavity with one or more light sources disposed therein to emit light along a light path towards the transparent layer to provide in-line illumination.

16. The artificial window system of claim 11, the controller configured to send a signal to cause at least one or more of a change in air flow for a surrounding environment, output of audio, and/or a heating ventilation and air conditioning (HVAC) system to adjust operation.

17. The artificial window system of claim 11, the artificial window system being located in a health care environment, an office building or a residential building.

18. The artificial window system of claim 11, the artificial window system being implemented as a portable window system.

19. A computer-implemented method of power management for an artificial window having at least a first display panel and an associated lighting panel, the method comprising:
receiving, by a controller, a signal indicating a region of the first display panel is obscured from user view; and
sending, by the controller, a first signal to cause the first display panel to transition into a low-power mode, wherein transitioning to a low-power mode includes dimming a backlight associated with the region of the first display panel obscured from view.

20. The computer-implemented method of claim 19, further comprising sending, by the controller, a second signal to cause the associated lighting panel to transition into a low-power mode, wherein transitioning to a low-power mode includes reducing output power of the light panel and/or switching off one or more light devices of the associated lighting panel.

* * * * *